Mar. 3, 1925.
G. J. RACKHAM
1,528,452
CHANGE SPEED DEVICE
Filed Sept. 24, 1923
2 Sheets-Sheet 1
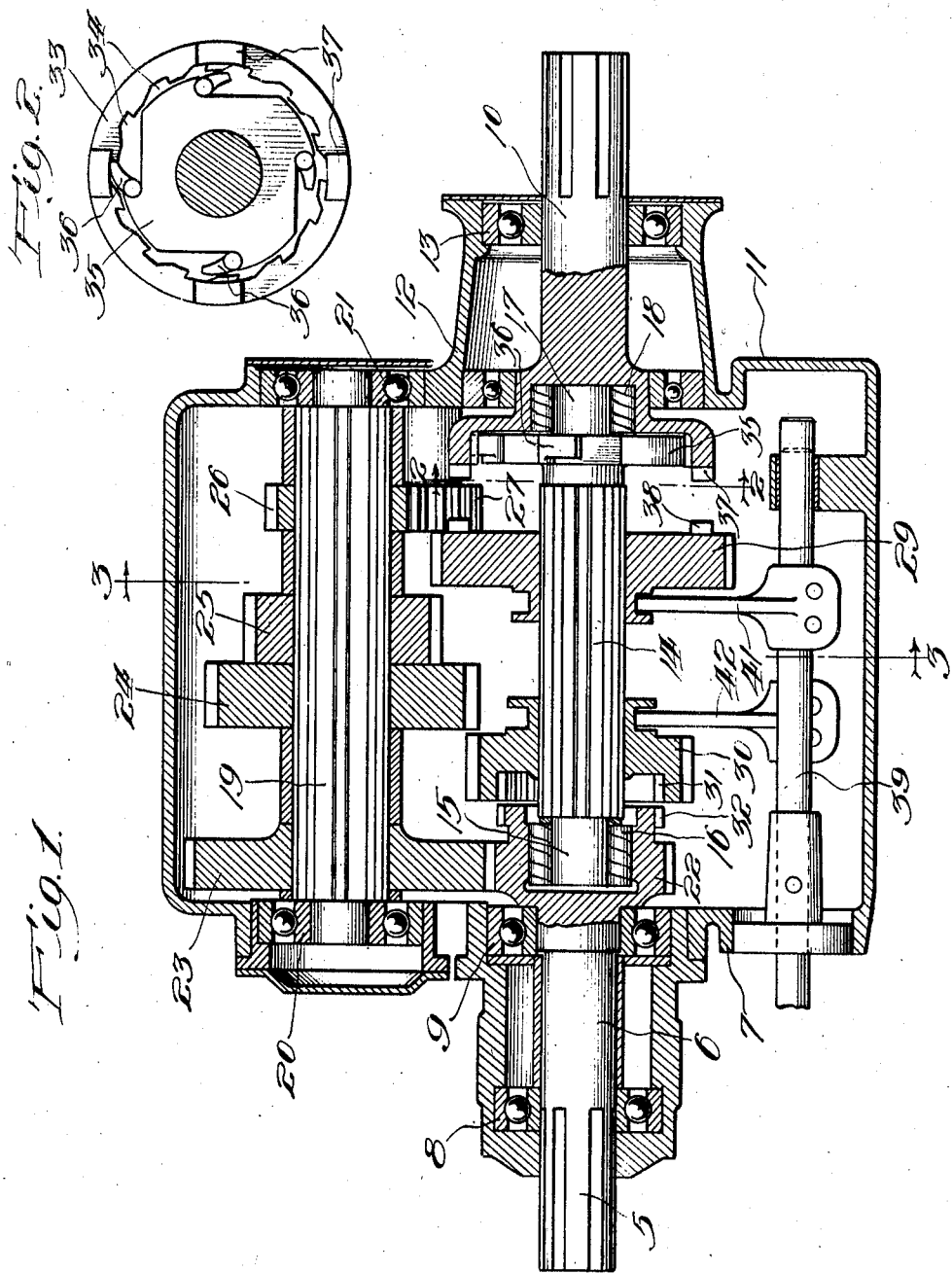
Inventor:
George J. Rackham
by
Attys.

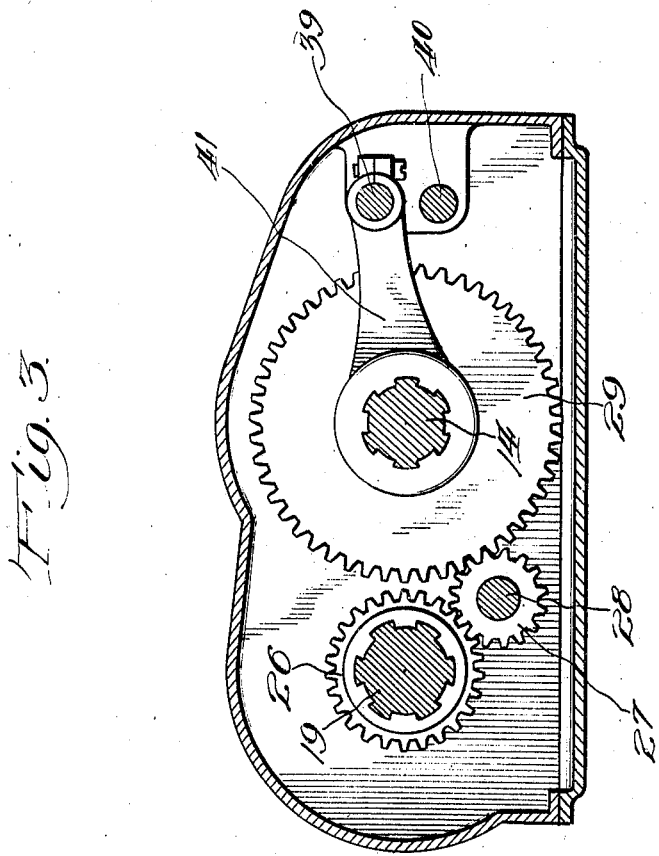

Patented Mar. 3, 1925.

1,528,452

UNITED STATES PATENT OFFICE.

GEORGE J. RACKHAM, OF CHICAGO, ILLINOIS. ASSIGNOR TO YELLOW COACH MANUFACTURING CO., OF CHICAGO, ILLINOIS, A CORPORATION OF ILLINOIS.

CHANGE-SPEED DEVICE.

Application filed September 24, 1923. Serial No. 664,524.

*To all whom it may concern:*

Be it known that I, GEORGE J. RACKHAM, a subject of the King of England, residing at Chicago, in the county of Cook and State of Illinois, have invented certain new and useful Improvements in Change-Speed Devices, of which the following is a specification.

This invention has to do with certain improvements in change speed devices or transmissions, and has reference particularly to improvements in change speed devices for use in connection with automobiles and other motor vehicles.

The main object of the present invention is to make provision for facilitating the transition from higher to lower speed combinations without the clashing of gears and without the necessity of abnormally or particularly speeding up the engine during such transition.

In connection with the foregoing, it will be understood that in the ordinary change speed transmission the passage from higher to lower speed combinations presents difficulties, owing to the fact that the speed of the transmission shaft should be increased as the gear ratio is multiplied, assuming that the speed of the propeller or driven shaft does not materially decrease. According to the present invention, however, I provide what I term a free wheel connection within the transmission mechanism, which free wheel connection is so constituted as to allow the driven or propeller shaft to run ahead of the transmission shaft in case the speed of the propeller shaft tends to exceed that of the transmission shaft. This will make it possible to re-engage the transmission shaft in the new gear combination of lower order without particular reference to the actual speed of the propeller shaft itself, since the latter at such times is allowed to run ahead of the transmission shaft, which condition will continue until the speeds of the two shafts become gradually equalized, or until the driving force applied by the engine causes a driving tendency from the transmission shaft to the propeller shaft.

In connection with the foregoing free wheel attachment, I have also made provision for the establishment of a proper driving connection for reverse drive, so that at such times the free wheel connection will not interfere with the proper transmission of power.

Other objects and uses of the invention will appear from a detailed description of the same, which consists in the features of construction and combinations of parts hereinafter described and claimed.

In the drawings:

Figure 1 shows a horizontal section through a gear transmission embodying the features of the present invention;

Fig. 2 shows a fragmentary section on line 2—2 of Fig. 1 looking in the direction of the arrows; and Fig. 3 shows a cross section on line 3—3 of Fig. 1 looking in the direction of the arrows.

In the drawings, the engine connection is established to the end 5 of the driving shaft 6, which driving shaft is journalled in the front head 7 of the transmission casing by the use of ball bearings 8 and 9. The driven shaft 10, which ordinarily connects to the universal joint at the front end of the propeller shaft, is journalled in the rear head 11 of the casing by ball bearings 12 and 13. The shafts 6 and 10 are placed in alignment with each other.

Intermediate between the shafts 6 and 10 is a transmission shaft 14. Its front end 15 is of reduced size and is journalled in the rear end of the driving shaft 6 by means of roller bearings 16. The rear end 17 of the transmission shaft 14 is also of reduced size and is journalled in the driven shaft 10 by means of a roller bearing 18.

The lay shaft 19 is placed at one side of the transmission shaft and is journalled in the front and rear heads of the casing by ball bearings 20 and 21 respectively. A pinion 22 on the rear end of the driving shaft 6 meshes constantly with a gear 23 on the lay shaft 19, so that the lay shaft rotates at a fixed speed ratio with respect to the driving shaft 6.

On the lay shaft 19 are forward drive gears 24 and 25 and a reversing gear 26. The reversing gear is constantly in mesh with an idler pinion 27 located upon a short jack shaft 28 at one side of the lay shaft.

Splined upon the transmission shaft 14 is a gear 29 which when moved in one direction will mesh directly with the low speed forward drive gear 25, and when moved in the other direction will mesh with the idler pinion 27 for reverse drive.

Splined upon the transmission shaft 14 is another gear 30 which when moved rearwardly will mesh directly with the intermediate forward speed gear 24. The gear 30 has on its forward face a clutch element 31 which, when the gear 30 is moved forwardly a sufficient distance, will engage the clutch element 32 on the rear face of the pinion 22 on the driving shaft 6. This will establish direct drive.

The front end of the driven shaft 10 carries an annular flange 33 having on its forward face a series of notches 34. The rear end of the transmission shaft 14 carries a plate 35 having a series of spring pressed dogs or pawls 36 which will engage the notches 34 when the transmission shaft 14 tends to drive the driven shaft 10 forwardly. On the other hand, this arrangement allows the driven shaft 10 to run ahead of the transmission shaft when such driving effort is no longer applied or when the driving effort comes from the propeller shaft.

On the flange 33 is a series of clutch blocks 37, and on the rear face of the gear 29 is another series of clutch blocks 38 in position to engage the clutch blocks 37 during the interval when the gear 29 is engaged with the reversing idler pinion 27. Consequently, during the reversing operation the free wheel connection becomes ineffective and does not interfere with the proper reverse drive.

The gears 29 and 30 may be shifted back and forth in any convenient manner, but in the arrangement illustrated I have provided shifting bars 39 and 40 which extend longitudinally of the casing. The bar 39 has a fork 41 which engages a suitable collar on the gear 29, and the bar 40 has a fork 42 which engages a suitable collar of the gear 30.

The following is a sequence of movements in the ordinary operation of this device: The parts are shown in Fig. 1 as standing in neutral position. The first or low speed forward drive is secured by shifting the gear 29 forwardly into mesh with the lay shaft pinion 25; the second speed forward is secured by restoring the pinion 29 to the position shown in Fig 1 and then shifting the pinion 30 into mesh with the lay shaft pinion 24; the direct forward drive is secured by retaining the pinion 29 in the position shown in Fig 1 and shifting the pinion 30 clear over to bring its clutch element 31 into engagement with the clutch element 32. The reversing position is secured by leaving the pinion 30 in the position shown in Fig 1 and then shifting the pinion 29 rearwardly into engagement with the idler pinion 27 which is driven from the lay shaft through the medium of the pinion 26. At the same time the clutch teeth 38 engage the clutch teeth 37, so that the propeller shaft 10 is driven in reverse notwithstanding the presence of the free wheel attachment I wish to point out that this arrangement allows the propeller shaft to run ahead of the shaft 14 when driving forward in those cases in which the tendency is for the speed of the propeller to exceed that of the shaft 14

I wish to point out the fact that while I have herein shown and described the features of the present invention as being applied particularly to a gear transmission, still they may also be applied to equal advantage in the case of transmission using chain drives; and in a companion application for Letters-Patent of the United States, on improvements in change speed transmissions and the like, executed by me of even date herewith, I have illustrated a combination of parts including a chain drive transmission having applied thereto a free wheel attachment of the general nature of the present invention.

While I have herein shown and described only a certain embodiment of the features of my present invention, still I do not limit myself to the same except as I may do so in the claim.

I claim:

In a change speed transmission, the combination of driving and driven shafts in alignment with each other, the adjacent ends of such shafts being separated, a transmission shaft intermediate between said ends and in alignment with both of said shafts, a lay shaft parallel to the transmission shaft, a permanent driving connection between the driving and lay shafts, a series of forward drive gears on the lay shaft of different sizes, a reversing gear on the lay shaft, an idler pinion in mesh therewith, a gear splined on the transmission shaft and adapted to engage either the idler pinion or one of the lay shaft gears, another gear splined on the transmission shaft and adapted to engage the other lay shaft gear, a clutch element on the last mentioned transmission shaft gear adapted to engage a clutch element on the driving shaft to directly drive the transmission shaft, a driving connection between the transmission shaft and the driven shaft, adapted to transmit rotation only in the forward direction, and a clutch device on the first mentioned transmission shaft gear adapted to engage a clutch device on the driven shaft when said gear is in engagement with the idler pinion aforesaid, substantially as described

GEORGE J. RACKHAM.